United States Patent
Badwe et al.

(10) Patent No.: US 9,581,980 B2
(45) Date of Patent: Feb. 28, 2017

(54) METHOD AND SYSTEM FOR UPDATING A MODEL IN A MODEL PREDICTIVE CONTROLLER

(71) Applicant: ABB RESEARCH LTD, Zurich (CH)

(72) Inventors: Abhijit Badwe, Pune (IN); Nandkishor Kubal, Pune (IN); Shrikant Bhat, Nagpur (IN); Naresh Naranbhai Nandola, Gu arat (IN)

(73) Assignee: ABB Schweiz AG, Baden (CH)

( * ) Notice: Subject to any disclaimer, the term of this patent is extended or adjusted under 35 U.S.C. 154(b) by 975 days.

(21) Appl. No.: 13/654,698

(22) Filed: Oct. 18, 2012

(65) Prior Publication Data

US 2013/0041482 A1 Feb. 14, 2013

Related U.S. Application Data

(63) Continuation of application No. PCT/IB2011/000845, filed on Apr. 19, 2011.

(30) Foreign Application Priority Data

Apr. 19, 2010 (IN) .......................... 1086/CHE/2010

(51) Int. Cl.
*G05B 13/02* (2006.01)
*G05B 13/04* (2006.01)

(52) U.S. Cl.
CPC ......... *G05B 13/048* (2013.01); *G05B 13/041* (2013.01); *G05B 13/042* (2013.01)

(58) Field of Classification Search
CPC .... G05B 13/04; G05B 13/041; G05B 13/042; G05B 13/045; G05B 13/048
USPC ...................... 700/28, 29, 30, 31, 38, 44, 45
See application file for complete search history.

(56) References Cited

U.S. PATENT DOCUMENTS

| 6,233,492 | B1 * | 5/2001 | Nakamura ....... G05B 19/41865 700/2 |
| 7,096,085 | B2 * | 8/2006 | Paik ..................... G05B 13/041 700/108 |
| 7,187,989 | B2 * | 3/2007 | Attarwala ...................... 700/29 |
| 7,221,990 | B2 * | 5/2007 | Paik ..................... G05B 13/041 700/109 |

(Continued)

FOREIGN PATENT DOCUMENTS

WO  WO 2008/119008 A1  10/2008

OTHER PUBLICATIONS

International Search Report (PCT/ISA/210) issued on Jul. 11, 2011, by the Indian Patent Office as the International Searching Authority for International Application No. Continuation of PCT/IB2011/000845.

*Primary Examiner* — Charles Kasenge
(74) *Attorney, Agent, or Firm* — Barnes & Thornburg LLP

(57) ABSTRACT

Exemplary embodiments relate to a method and system for updating a model in a model predictive controller. The system executing a method that includes assessing the deviation of the operating performance level from the desired performance level of the process plant, and diagnosing the model predictive control for the model plant mismatch by updating the model in a model predictive controller. The step of diagnosing the model predictive controller includes determining the model prediction error in relation to model plant mismatch, quantifying the model plant mismatch, and updating the model in the model predictive controller.

9 Claims, 2 Drawing Sheets

(56) References Cited

U.S. PATENT DOCUMENTS

| | | | |
|---|---|---|---|
| 7,451,004 B2* | 11/2008 | Thiele et al. | 700/28 |
| 7,536,232 B2* | 5/2009 | Boyden et al. | 700/52 |
| 7,640,067 B2* | 12/2009 | Boyden et al. | 700/52 |
| 7,856,281 B2* | 12/2010 | Thiele et al. | 700/32 |
| 8,185,217 B2* | 5/2012 | Thiele | 700/29 |
| 2005/0137721 A1* | 6/2005 | Attarwala | 700/30 |
| 2005/0278051 A1* | 12/2005 | Paik | G05B 13/041 700/108 |
| 2006/0195214 A1* | 8/2006 | Paik | G05B 13/041 700/109 |
| 2007/0078529 A1* | 4/2007 | Thiele et al. | 700/29 |
| 2008/0243289 A1 | 10/2008 | Yelchuru et al. | |
| 2009/0143872 A1* | 6/2009 | Thiele et al. | 700/30 |
| 2009/0198350 A1* | 8/2009 | Thiele | 700/30 |

* cited by examiner

METHOD AND SYSTEM FOR UPDATING A MODEL IN A MODEL PREDICTIVE CONTROLLER

RELATED APPLICATIONS

This application claims priority as a continuation application under 35 U.S.C. §120 to PCT/IB2011/000845, which was filed as an International Application on Apr. 19, 2011 designating the U.S., and which claims priority to Indian Application 1086/CHE/2010 filed in India on Apr. 19, 2010. The entire contents of these applications are hereby incorporated by reference in their entireties.

FIELD

The invention relates to systems and methods associated Model Predictive Control (MPC), such as a method and a system for updating a model in a Model Predictive Controller.

BACKGROUND INFORMATION

In a process control industry, Advanced Process Control (APC) is employed to reduce operating costs, achieve high productivity, maintain quality, and for other similar reasons. APC allows transition from present operating schema to an improved and more productive operating schema of the process control industry, and also accommodate operating and design constraints of the process involved in the process control industry.

Known multivariable APCs can implement an advanced multivariable control scheme called Model Predictive Control (MPC) in Multivariable Predictive Controllers. MPCs use a mathematical model of the process involved in the process plant, in order to predict the future dynamic behavior of the process and accordingly provide optimal manipulated variables for the process and operation of the plant thereof. From this, it can be understood that accuracy of the model is a key element in effective and successful implementation of MPC.

Plant dynamics changes are resulting in a mismatch between the model and the plant, termed as Model Plant Mismatch (MPM). MPM leads to inaccurate predictions of the plant dynamics. Using APC having a model impacted by the MPM can degrade the MPC and overall control performance thereof, which can also alter the product quality and causes economic losses.

It becomes important to update the model upon detection of poor performance of the controller, in order to eliminate the performance degradation of the controller. Poor performance of the controller can be detected by well-established MPC performance monitoring. For instance, a simple approach could be to analyse the prediction errors, which being the difference between the model predictions and true outputs. After the detection of poor performance of the controller, cause for the same, such as poor model (e.g., MPM), unmeasured disturbance, and constraint saturation etc. can be identified and diagnosed using established diagnosis techniques.

In know systems upon identification or detection of a poor model, MPM is diagnosed by and after re-identification of the model. Re-identification of the model involves designing the perturbation signal, deciding and/or considering the operating conditions of the plant during perturbation, choosing an appropriate model and estimating model parameters. This can call for a high degree of expertise and can be time consuming. Also, it can involve a longer perturbation period, by which a large amount or number of product with low quality, usually termed as off spec product are produced during the perturbation period.

SUMMARY

An exemplary method for updating a model in a model predictive controller is disclosed, the method comprising: assessing the deviation of the operating performance level from the desired performance level of the process plant; diagnosing the model predictive control (MPC) for the model plant mismatch (MPM), by updating the model in a model predictive controller and of the MPC thereof; wherein diagnosing said MPC comprises determining the model prediction error in relation to MPM, quantifying the MPM, and updating the model in said model predictive controller.

An exemplary system of a model in a model predictive controller (MPC) in, the system comprising: a performance monitor unit that monitors performance of the MPC; a detection unit that detects the cause for deviation of the operating performance level from the desired performance level of the process plant; a white noise generator unit that generates white noise signals sufficient to compute non-zero lag correlation coefficients; an estimator unit that estimates a model prediction error by calculating a difference between an output value of the process plant and of an existing model of the MPC; a quantifier unit that quantifies a model plant mismatch (MPM) from the estimated model prediction error; and an updater unit that provides an updated model based on the quantified MPM and updating the model of the process plant in the model predictive controller.

An exemplary computer readable medium having computer program code recorded thereon is disclosed, which when the computer readable medium is in communicable contact with a computer, the computer program code causes the computer to execute a method of updating a model in a model predictive controller, the method comprising: assessing a deviation of an operating performance level from a desired performance level of the process plant; diagnosing model predictive control (MPC) for a model plant mismatch (MPM) by updating the model in the model predictive controller and of the MPC thereof; wherein diagnosing said MPC comprises determining the model prediction error in relation to MPM, quantifying the MPM, and updating the model in said model predictive controller.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure reduce the perturbation period during diagnosis of MPM for reducing and/or eliminating MPM, and reduce the MPM more efficiently.

An exemplary embodiment provides a method and system for updating a model in a model predictive controller of a process plant, to reduce and/or eliminate the deviation of the operating performance level from the desired performance level of the process plant arising out of MPM.

Accordingly, another exemplary embodiment provides a method for model update in a model predictive controller. The method comprises assessing the deviation of the operating performance level from the desired performance level of the process plant. Diagnosing the model predictive control (MPC) for the model plant mismatch (MPM) is performed by updating the model in a model predictive controller and of the MPC thereof. Diagnosing the MPC comprises determining the model prediction error in relation to MPM. Then, quantifying the MPM and updating the model in the said model predictive controller.

Accordingly, an exemplary embodiment of the present disclosure also provides a system for updating a model in a model predictive controller in accordance with an exemplary method of the present disclosure. The system comprises a performance monitor unit for monitoring the performance of the MPC, a detection unit for detecting the cause for deviation of the operating performance level from the desired performance level of the process plant and a white noise generator unit for generating white noise signals that are sufficient to compute m+1 non-zero lag correlation coefficients, where m is number of manipulated variables of MPC. An estimator unit is provided for estimating the model prediction error by calculating the difference between the output value of the controllers in the process plant and of the existing model of the MPC. Also, a quantifier unit is provided for quantifying the MPM. Further, the system has an updater unit for providing an updated model based on the quantified MPM and for updating the model of the process plant in the model predictive controller.

$$(SP_i)_{DCS,t} = SP_i(t) + w_i(t)$$

Here $SP_i$ (t) is the $i^{th}$ setpoint value when the MPC is in "Offline" mode, $w_i(t)$ is the value in the $i^{th}$ white noise sequence at time instant t and $(SP_i)_{DCS,t}$ is the $i^{th}$ setpoint value going to the DCS (210). In the event of the MPC (220) being "Online", $SP_i$ (t) is computed by MPC (220) and hence is a manipulated variable of the MPC (220). Also, in the MPC (220) "Online" mode, $$(SP_i)_{DCS,t} = SP_i(t) = MV_i(t)$$

Figure 1:
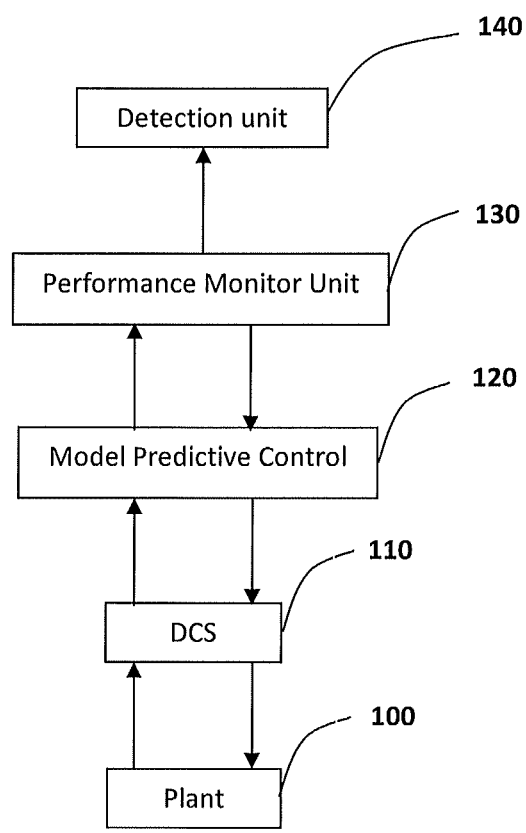
FIG. 1 shows a model predictive control setup in a process plant of a known implementation.
Figure 2:
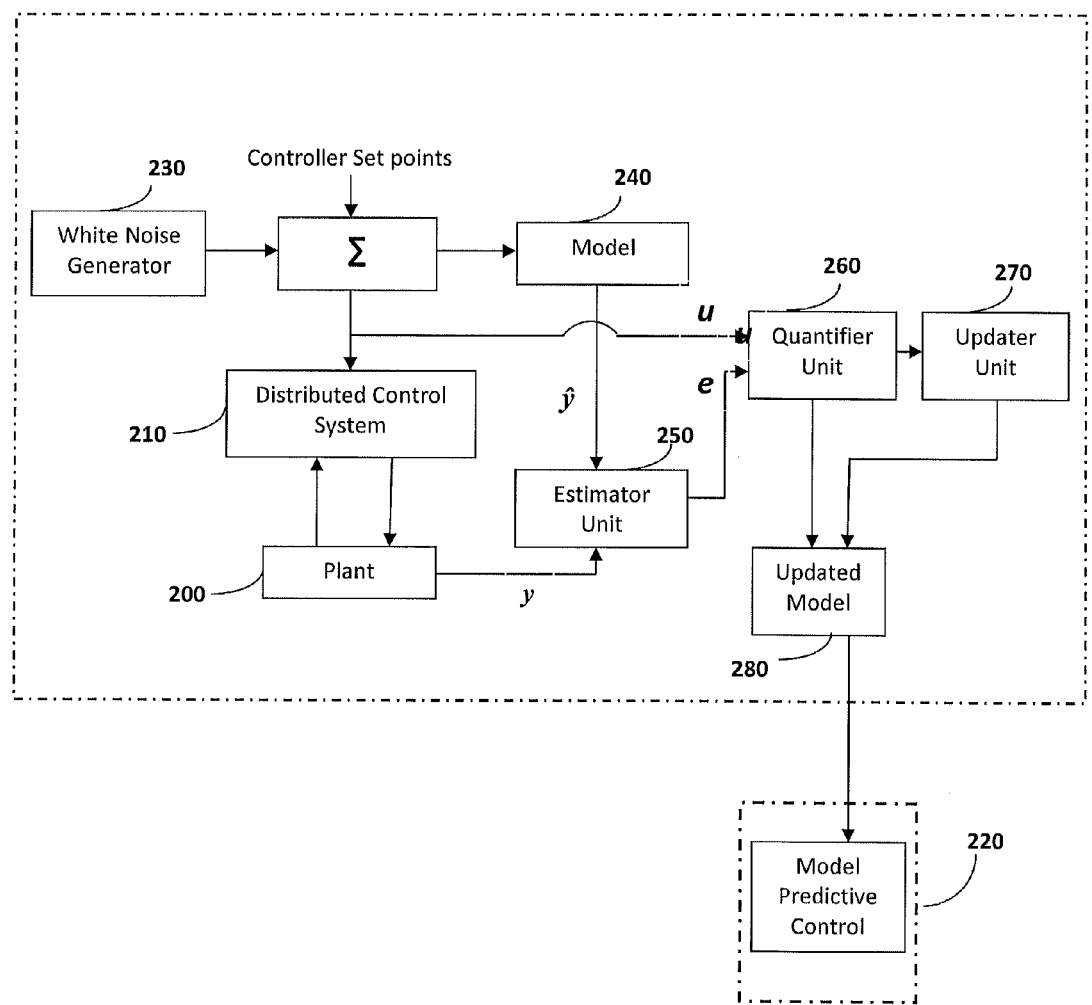
FIG. 2 shows a framework for model update in model predictive controller in accordance with an exemplary embodiment of the present disclosure.

The $(SP_i)_{DCS,t}$ values are also passed to the existing Model (240), outputs of which are denoted by $\hat{y}$, which are predicted values of controlled variables. The actual values of controlled variables from plant (200) are denoted by y. The controlled variable values from the plant (200) may be obtained through online measurements or through other suitable means such as periodic laboratory analysis. The difference between the measured value y and that predicted by the model (240), $\hat{y}$ is known as the model prediction error or model residual and is denoted by e. Note that in FIG. 2, $(SP_i)_{DCS,t}$ is denoted by u for notational simplicity.

Quantifier unit (260) calculates the lag correlation coefficients between e and u. The values of these coefficients are used to calculate the "gap" between the existing model and the current plant to quantify the MPM.

Considering a single input and single output open loop condition of a process plant, for the purpose of simplicity in understanding, the following case for gain mismatch is explained. This is in no way restrictive and is purely exemplary and non-exhaustive with regard to the exemplary embodiment. Similarly, exemplary embodiments disclosed herein holds good for multi input and multi output as well as closed loop conditions also and can be applied coextensively.

For a first order time delay system, the polynomial representation is as follows:

$$y(k) = ay(k-1) + bu(k - t_{dp} - 1) + \Theta(k)$$

$$\hat{y}(k) = a_m \hat{y}(k-1) + b_m u(k - t_{dm} - 1)$$

where y(k) is the output of the plant; $\hat{y}$ (k) is the output of the model; and e(k) is the model error;
a and b are the parameters of the plant; $a_m$ and $b_m$ are the parameters of the model;
k is the sampling instance;
$t_{dp}$ is the time delay for plant; $t_{dm}$ is the time delay for model
Considering only gain mismatch (i.e. $a=a_m$ and $t_{dp}=t_{dm}$)

$$e(k) = y(k) - \hat{y}(k) = ae(k-1) + (b - b_m)u(k - t_{dp} - 1) + \Theta(k) \quad (1)$$

Even if there is a mismatch disclosed herein in all the three parameters i.e. a, b and $t_d$, exemplary methods disclosed herein can be applied. For simplicity reason mismatch in only one parameter i.e. gain or b and $b_m$ is considered.

Now, the correlation coefficient at lag m between two time-series $x_1$ and $x_2$ is given by, $$r_m = \frac{E[x_1(k)x_2(k-m)]}{\sigma_{x1}\sigma_{x2}}$$

$$r'_m = r_m \sigma_{x1} \sigma_{x2} = E[x_1(k)x_2(k-m)]$$

Then, from Equation 1,
At lag 0, $r'_0 = E[e(k)u(k)] = 0$
At lag 1, $r'_1 = E[e(k)u(k-1)] = 0$
At lag $t_{dp}+1$, $r'_{t_{dp}+1} = E[e(k)u(k-t_{dp}-1)] = (b-b_m)\sigma^2$
At lag $t_{dp}+2$, $r'_{t_{dp}+1} = E[e(k)u(k-t_{dp}-2)] = a(b-b_m)\sigma^2$
At lag $t_{dp}+n$, $r'_{t_{dp}+n} = E[e(k)u(k-t_{dp}-n)] = a^{n-1}(b-b_m)\sigma^2$ Thus, the first non-zero correlation coefficient is observed at lag $t_{dp}+1$. Moreover, the correlation shows an exponential decay.

A
Now, suppose $\hat{r}_{t_{dp}+1}$ is the correlation coefficient observed between e and u at lag
$t_{dp}+1$. We can then write, $$\hat{r}_{tdp+1} = \frac{(b - b_m)\sigma^2}{\sigma_e \sigma} \quad PM \text{ quantitatively}$$

An updater unit (270) updates the existing model (240) to an updated model (280) based on the quantified MPM and updates the model of the MPC (220) in the model predictive controller. The MPC (220) is then switched to online mode.

Exemplary embodiments of the present disclosure can also be extended to updating a sub model in the similar manner as described herein before in the description. The identification of the sub model that needs to be updated due to MPM can be accomplished by known techniques such as that which applies partial correlation analysis or any other suitable techniques or method. This way, updating the model at sub model level further reduces the effort in updating the model for MPM and becomes more efficient.

Thus the exemplary embodiments disclosed herein can be applied for updating the entire model or the sub model as the case may be.

The exemplary embodiments of the present disclosure are not restrictive in nature with regard to the scope of the invention. Other modification, changes, alteration that would cater to the same functionality and approach, and not being specifically mentioned or stated in this description are construed to be well within the scope of the invention. The usage of singular terms would include its plural form and vice versa within the meaning of the scope of the invention.

Exemplary embodiments disclosed herein find extensive usage in chemical and petrochemical, cement, pulp and paper, and pharmaceutical industries to name a few. Some of the other applications include power generation, supply chain management, and behavioral health etc.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for updating a model in a model predictive controller of a distributed control system in a process plant, the method comprising:
   assessing deviation of operating performance level from desired performance level of the process plant;
   diagnosing model predictive control (MPC) for model plant mismatch (MPM), for updating the model in the model predictive controller and of the MPC thereof; wherein diagnosing said MPC comprises:
   a. determining a model prediction error in relation to MPM, wherein determining the model prediction error in relation to MPM comprises:
      adding white noise to set point values of controllers in the process plant;
      providing set points with white noise to the controllers in the process plant and to the model of the MPC; and
      estimating the model prediction error by calculating a difference between output values of the process plant and of the model of the MPC; and
   b. quantifying the MPM using non-zero lag correlation coefficients between the model prediction error and each of the manipulated variables of said MPC, said manipulated variables of the MPC being the set point values with added white noise of the controllers in the process plant; and
   c. updating the model in said model predictive controller for operation of the process plant based on the quantified MPM.

2. The method as claimed in claim 1, wherein assessing the deviation of the operating performance level from the desired performance level of the process plant includes monitoring the performance of the MPC, and detecting the cause for said deviation, said deviation of the operating performance level from the desired performance level of the process plant corresponds to MPM.

3. The method as claimed in claim 1, wherein diagnosing said MPC includes correcting said deviation of the operating performance level from the desired performance level of the process plant by correcting the model of said MPC for MPM and of the MPC thereof.

4. The method as claimed in claim 1, wherein the model update is performed offline or online.

5. The method as claimed in claim 1, wherein the process involved in the process plant is open loop or closed loop.

6. The method as claimed in claim 1, wherein said model includes an entire model of the process plant and/or a sub model thereof.

7. A system for updating a model in a model predictive controller (MPC) according to the method of claim 1, the system comprising:
   a performance monitor unit for monitoring performance of the MPC;
   a detection unit for detecting a cause for deviation of an operating performance level from a desired performance level of the process plant;
   a white noise generator unit for generating white noise signals sufficient to compute non-zero lag correlation coefficients;
   an estimator unit for estimating model prediction error by calculating a difference between an output value of the process plant and of an existing model of the MPC;
   a quantifier unit for quantifying a model plant mismatch (MPM) from the estimated model prediction error; and
   an updater unit for providing an updated model based on the quantified MPM and updating the model of the process plant in the model predictive controller.

8. A system for updating a model in a model predictive controller (MPC) of a distributed control system in a process plant, the system comprising:
   a performance monitor unit that monitors performance of the MPC;
   a detection unit that detects the cause for deviation of an operating performance level from a desired performance level of the process plant;
   a white noise generator unit that generates white noise signals sufficient to compute non-zero lag correlation coefficients;
   an estimator unit that adds white noise to set point values of the MPC of the process plant and estimates a model prediction error by calculating a difference between an output value of the process plant and of an existing model of the MPC;
   a quantifier unit that quantifies a model plant mismatch (MPM) from the estimated model prediction error and provides set points with white noise to controllers in the process plant and to the model of the MPC; and
   an updater unit that provides an updated model based on the quantified MPM and updates the model of the process plant in the model predictive controller.

9. A non-transitory computer readable medium having computer program code stored thereon, which when the non-transitory computer readable medium is in communicable contact with a computer, the computer program code causes the computer to execute a method of updating a model in a model predictive controller, the method comprising:
   assessing a deviation of an operating performance level from a desired performance level of a process plant;
   diagnosing model predictive control (MPC) for a model plant mismatch (MPM) by updating the model in the model predictive controller and of the MPC thereof; wherein diagnosing said MPC comprises;
   a. determining a model prediction error in relation to MPM, wherein determining the model prediction error in relation to MPM comprises:
      adding white noise to set point values of controllers in the process plant;

providing set points with white noise to the controllers in the process plant and to the model of the MPC; and estimating the model prediction error by calculating a difference between output values of the process plant and of the model of the MPC; and b. quantifying the MPM using non-zero lag correlation coefficients between said model prediction errors and each of the manipulated variables of the MPC, said manipulated variables of the MPC being the set point values with added white noise of the controllers in the process plant; and c. updating the model in said model predictive controller based on the quantified MPM.

\* \* \* \* \*